United States Patent [19]

Markano

[11] 4,256,212
[45] Mar. 17, 1981

[54] FRUIT COLLECTOR FOR HILLSIDE ORCHARDS

[76] Inventor: Richard L. Markano, 137 Rancho Camino, Fallbrook, Calif. 92028

[21] Appl. No.: 951,174

[22] Filed: Oct. 13, 1978

Related U.S. Application Data

[63] Continuation-in-part of Ser. No. 781,217, Mar. 23, 1977, abandoned, and Ser. No. 854,638, Nov. 25, 1977, abandoned.

[51] Int. Cl.³ .................. B65G 11/08; B65G 11/20
[52] U.S. Cl. ................................ 193/7; 193/25 B; 193/27; 193/32
[58] Field of Search .................. 193/2 R, 7, 25 B, 32, 193/40, 27; 244/137 P; 182/48; 141/391, 392; 56/328 R, 328 TS, 329

[56] References Cited

U.S. PATENT DOCUMENTS

| | | | |
|---|---|---|---|
| 486,357 | 11/1892 | Settle | 193/7 X |
| 592,133 | 10/1897 | Davis | 193/32 X |
| 638,832 | 12/1899 | Carlton | 193/7 |
| 952,315 | 3/1910 | Erwin et al. | 182/48 |
| 976,871 | 11/1910 | Hammond | 193/7 |
| 1,561,448 | 11/1925 | Simon | 193/27 |
| 2,032,258 | 2/1936 | Caton | 193/7 |
| 2,765,131 | 10/1956 | Boyle | 244/137 P |
| 3,080,698 | 3/1963 | Beckman | 56/328 R |
| 3,194,375 | 7/1965 | Callow | 193/7 |
| 3,476,338 | 11/1969 | Fisher | 193/25 B X |
| 3,477,072 | 11/1969 | Frost | 56/329 X |
| 3,669,217 | 6/1972 | Fisher | 244/137 P X |
| 3,811,534 | 5/1974 | Fisher | 193/25 B X |

*Primary Examiner*—James L. Rowland
*Attorney, Agent, or Firm*—Lloyd Spencer

[57] ABSTRACT

A fruit collector for hillside orchards, which includes a channel spaced chute formed of inflated tubes, the two sides of the chute being joined by a cross web having a series of fruit receiving openings approximately the spacing between rows of trees, the chute being laid downhill between sloping rows of trees. In a first embodiment, the openings are formed by U-shaped slits to receive fruit, and retarding flaps extend into the chute to retard movement of the fruit. In a second embodiment, the cross web is tubular, but non-inflated, and receives a series of longitudinally extensible and retractable ribbons protruding from the upper margins of the openings and extending into the chute between the openings; the strips serve to retard movement of the fruit and may be in axially overlapping relation, and adjustable to change their retarding effect thereby to compensate for different degrees of slope. In a third embodiment, which may be incorporated with the first or second embodiments, selected inflated tubes may vary between a small area and a large area to retard the fruit by creating lateral movement of the fruit. A further embodiment having a cross section similar to any of the other embodiments, is arranged in a zig-zag pattern causing the fruit to move laterally in alternate directions so as to restrict the rate of movement of the fruit, thereby permitting use on a steeper slope.

9 Claims, 19 Drawing Figures

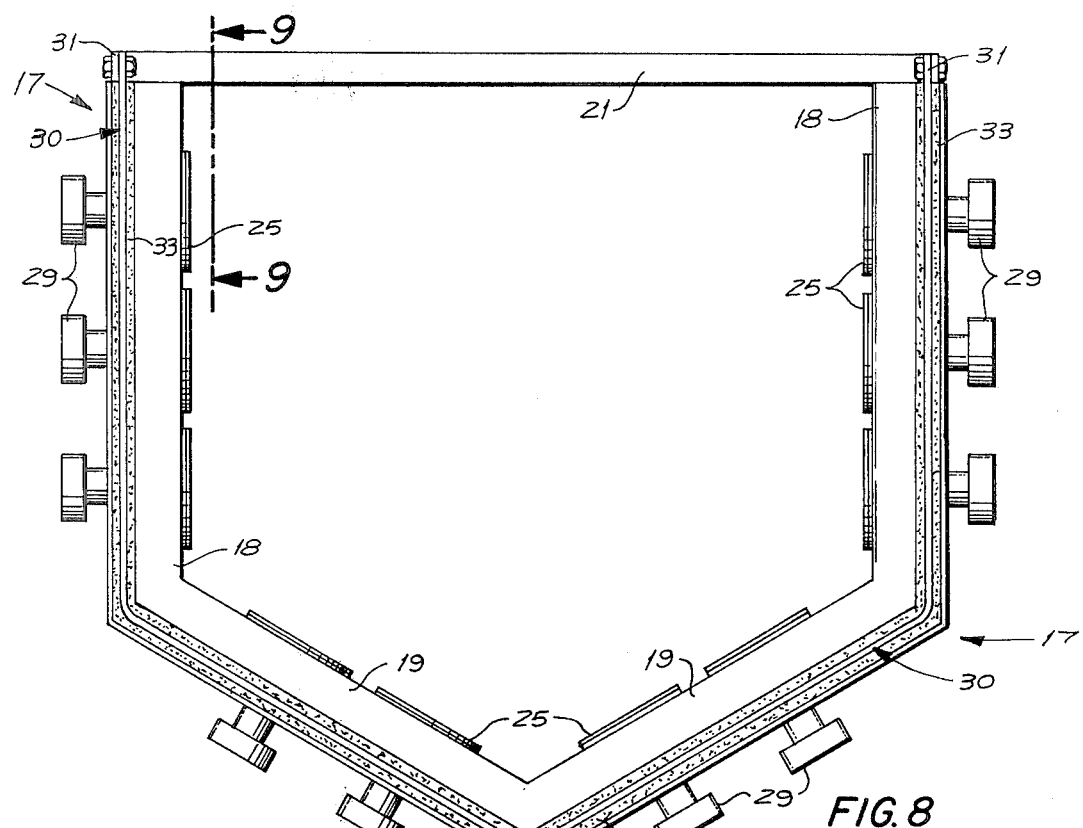
FIG. 8
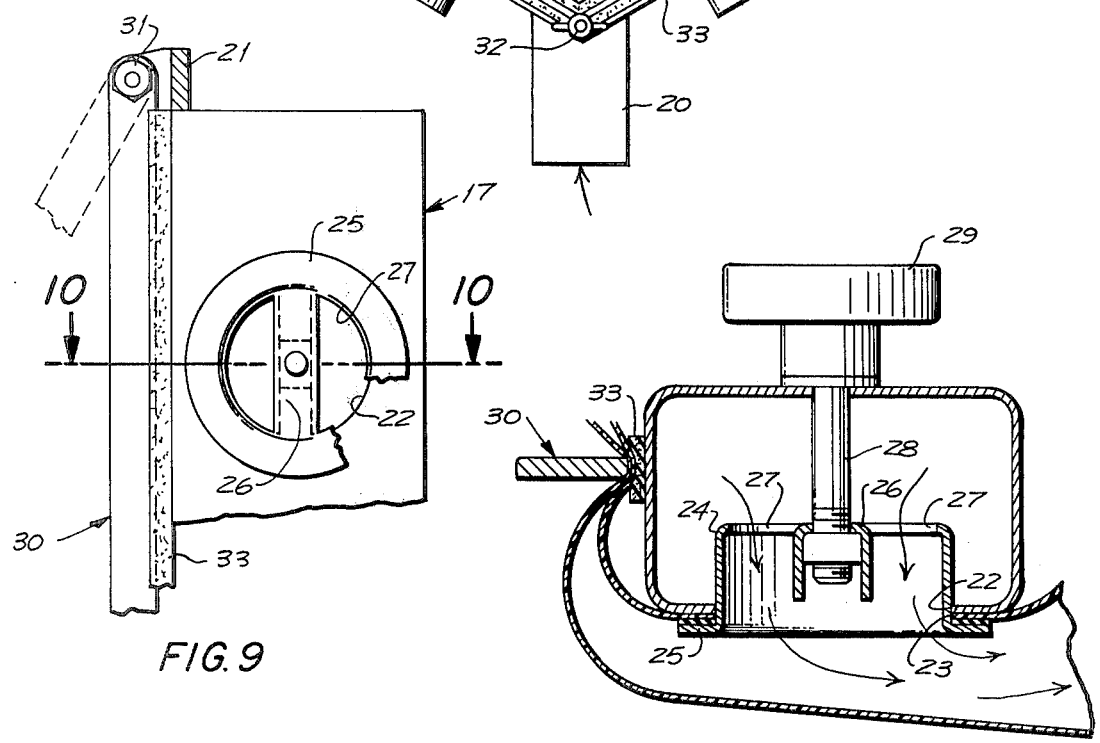
FIG. 9
FIG. 10

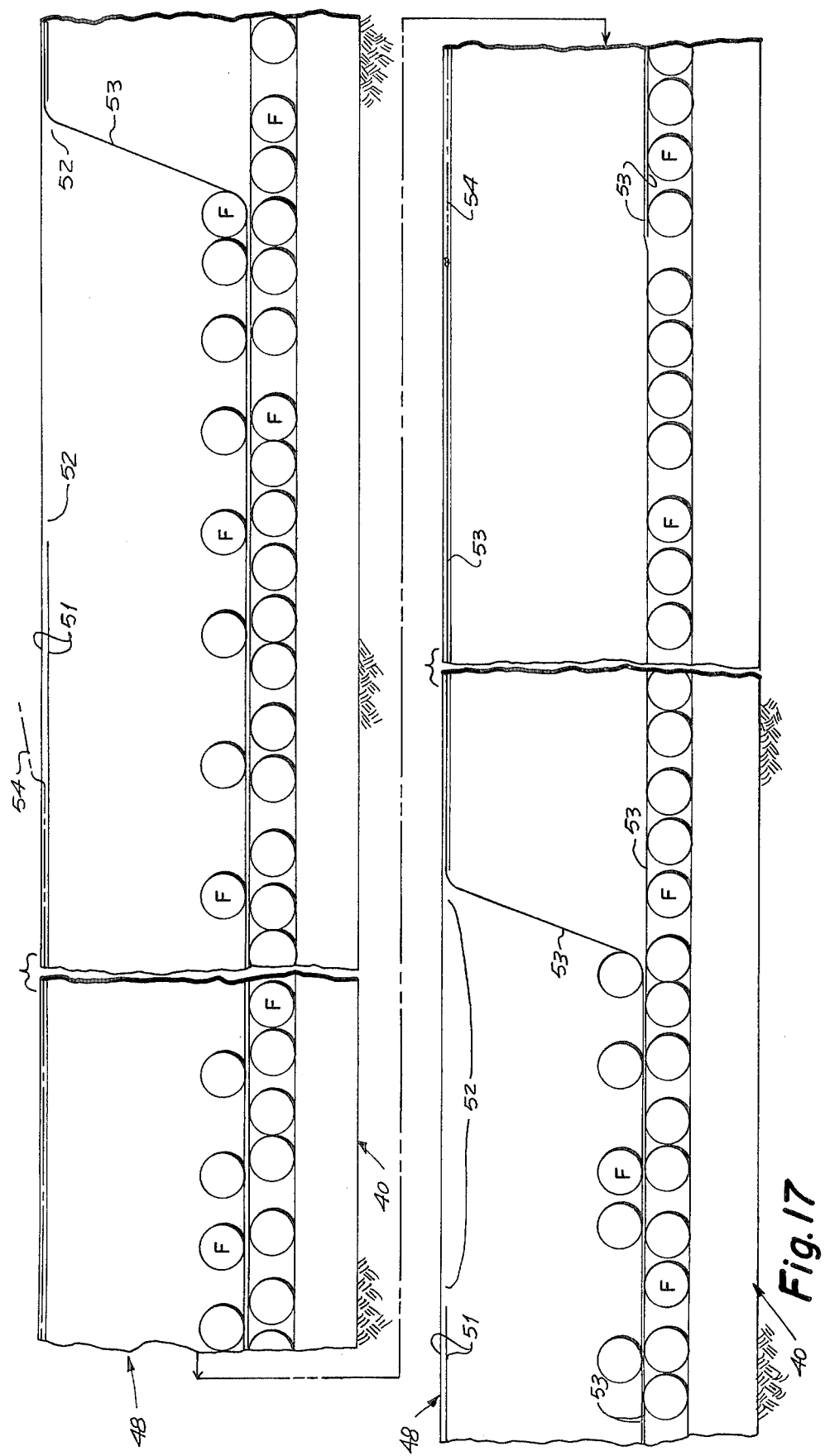

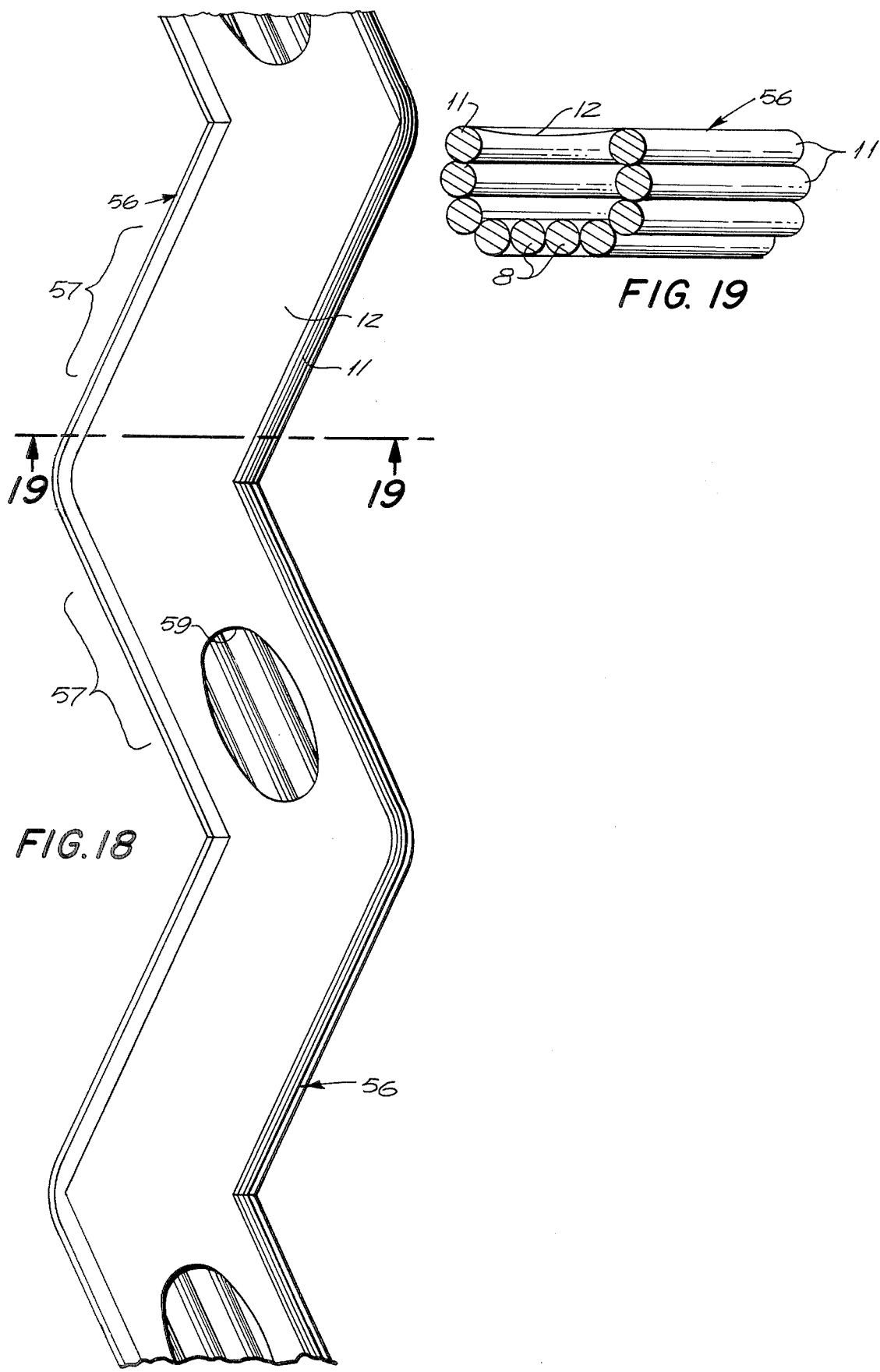

FRUIT COLLECTOR FOR HILLSIDE ORCHARDS

This application is a continuation-in-part of application Ser. No. 781,217, filed Mar. 23, 1977 for FRUIT COLLECTOR FOR HILLSIDE ORCHARDS, now abandoned; and also a continuation-in-part of application Ser. No. 854,638, filed Nov. 25, 1977 for FRUIT COLLECTOR FOR HILLSIDE ORCHARDS, now abandoned.

BACKGROUND

Several types of fruit gatherers or collectors have been used. One type involves an inflated bed which is placed under a tree, the tree is then shaken causing the fruit to fall on the bed from which the fruit is picked by hand, or the bed is manipulated to transfer the fruit to a field box, as represented by the following patents: U.S. Pat. Nos. 3,080,698; 3,370,409; 3,430,425; and 3,477,072. Another type involves an inclined chute or tube having inflatable means for controlling movement, as represented by the following patents: U.S. Pat. Nos. 592,133; 638,832; 2,022,258; 3,080,698; 3,194,375; 3,464,529; 3,489,258; and 3,602,349. Also, chutes having inflatable walls have been used for rescue of persons from buildings or grounded aircraft, as represented by the following patents: U.S. Pat. Nos. 352,315; 2,765,131; 3,669,217; 3,476,338; 3,726,375; 3,811,534; and 3,973,644.

In each case, the apparatus is located on essentially flat ground. Recently, increased use is being made of sloping areas, even a slope as much as 45°, or more, for plantings of avocados, citrus and other fruit orchards. When orchards are located on slopes, the harvesting problem is increased, and conventional harvesting equipment is not suitable.

SUMMARY

The present invention is directed to fruit collectors which are particularly suited for hillside orchards, and is summarized in the following objects:

First, to provide a fruit collector for hillside orchards, which includes a novelly arranged chute intended to be layed on a hillside between two rows of trees, the chute having tubular walls intended to be inflated to the extent that it is self-supporting, the chute having an upper side provided with spaced openings, located in proximity to opposed pairs of trees, through which fruit may be inserted and permitted to roll down the chute.

Second, to provide a fruit collector chute, one embodiment of which includes an uninflated upper side wall which is provided with spaced U-shaped cuts to form flaps, extending to the bottom side of the chute so as to retard the rate of movement of the fruit and increase the permitted slope of the collector chute.

Third, to provide a fruit collector chute, another embodiment of which includes a double wall, uninflated upper side web having a series of spaced openings from which emerge flexible fruit restraining strips which extend into the chute between the openings and are longitudinally adjustable to increase or decrease their restraining effect on the fruit, and may be of such length as to be disposed in axially over-lapping relation to increase their restraining effect.

Fourth, to provide a fruit collector, as indicated in the other objects, which utilizes selected tubes that vary in area to cause lateral as well as axial movement of the fruit, thus retarding movement of the fruit.

Fifth, to provide a fruit collector, as indicated in the other objects, which includes a novelly arranged manifold for connecting tubes formed in the walls of the chute with a source of air under pressure, the manifold, when disposed at the lower end of the chute, forming a discharge channel, cushioned by inflated ends of the tubes.

Sixth, to provide a fruit collector, as indicated in the preceding objects, which includes a novelly arranged curtain or apron placed in a field box and positioned to cushion fruit leaving the chute discharge channel so as to minimize damage to the fruit.

Seventh, to provide a fruit collector chute, as indicated in the other objects, wherein the collector chute may be carried by a reel mounted on a truck or the like capable of movement horizontally with respect to the orchard between sloping rows of trees, the chute being readily rolled upon the reel for such purpose, then unrolled down the hillside for repeated use.

Eighth, to provide a tubular fruit collector chute which is arranged in a zig-zag pattern to cause the fruit to move laterally in alternate directions thereby reducing the rate of fruit movement and permitting use on a steeper slope.

DESCRIPTION OF THE FIGURES

FIG. 8 is an end view of a manifold through which air is supplied to inflate the fruit collector, the strips comprising the collector chute being omitted to expose the manifold.

FIG. 9 is an enlarged fragmentary sectional view taken from 9—9 of FIG. 8.

FIG. 10 is an essentially full-size transverse sectional view taken through 10—10 of FIG. 9 showing adjacent portions of the fruit collector chute.

FIG. 17 is an enlarged fragmentary essentially diagrammatical longitudinal transverse sectional view of the chute, with the fruit being represented by circles, and the sectioned portions of the chute being represented by solid lines.

FIG. 18 is a fragmentary, essentially diagrammatical, plan view of a further embodiment of the fruit collector chute arranged in a zig-zag pattern.

FIG. 19 is an essentially diagrammatical sectional view taken through 19—19 of FIG. 18 showing a lateral portion in elevation.

DETAILED DESCRIPTION OF THE FIGURES

Figure 1:
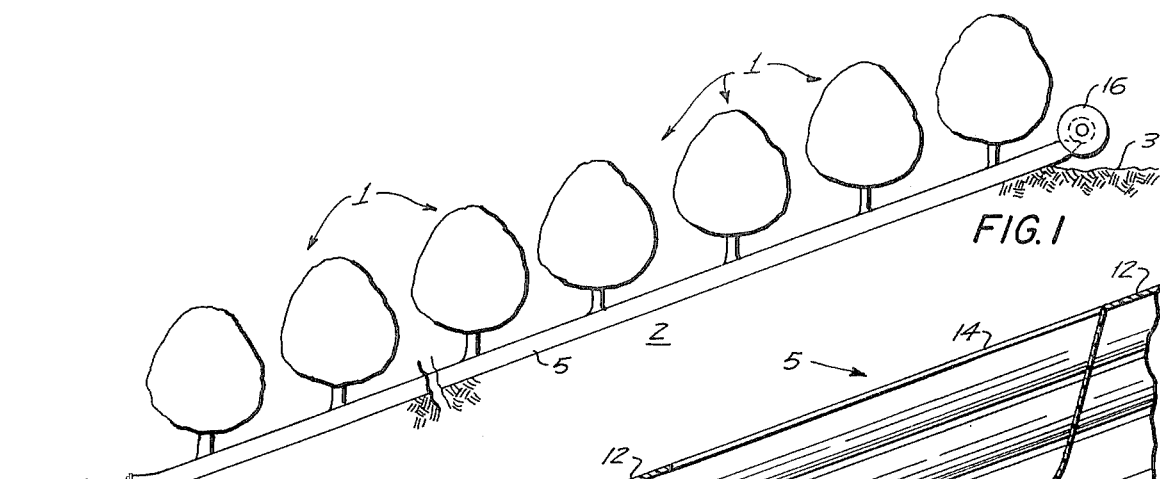
FIG. 1 is a small scale essentially diagrammatical view showing the fruit collector disposed on a hillside adjacent a row of trees.

Referring to the embodiment shown in FIGS. 1 through 12, and first to FIG. 1, the fruit collector is intended to be utilized for the harvesting of fruit from an orchard 1 located on a hillside 2 preferably provided with appropriately located upper and lower access roads 3 and 4. The fruit collector includes a chute 5 formed in part by a pair of lower strips 6 joined by a set of narrow webs 7 dividing the strips into a set of longitudinally extending inflatable tubes 8. The chute also includes a pair of upper strips 9 also joined longitudinally by a set of narrow webs 10. The lateral portions of the strips 9 form inflatable tubes 11 and a central tube which is not inflatable and which forms a top panel 12. The lateral margins of the lower strips 6 and upper strips 9 are joined by a connecting web 13.

Figure 2:
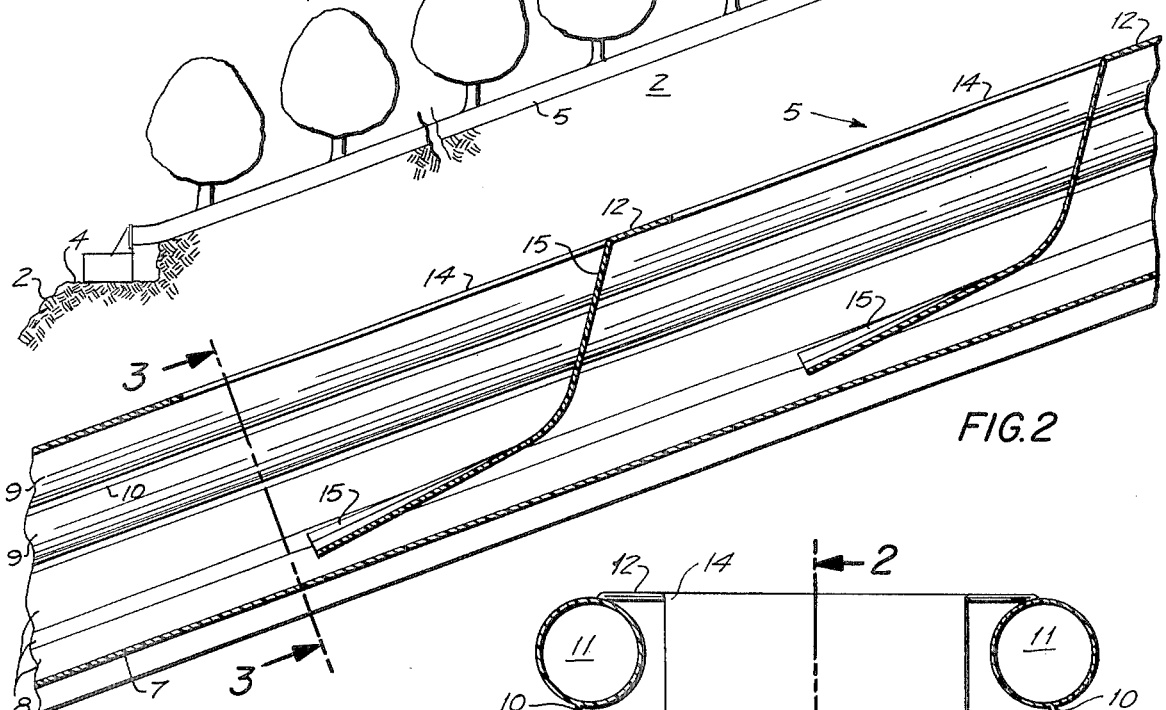
FIG. 2 is a fragmentary longitudinal sectional view of the fruit collector chute taken through 2—2 of FIG. 3.
Figure 3:
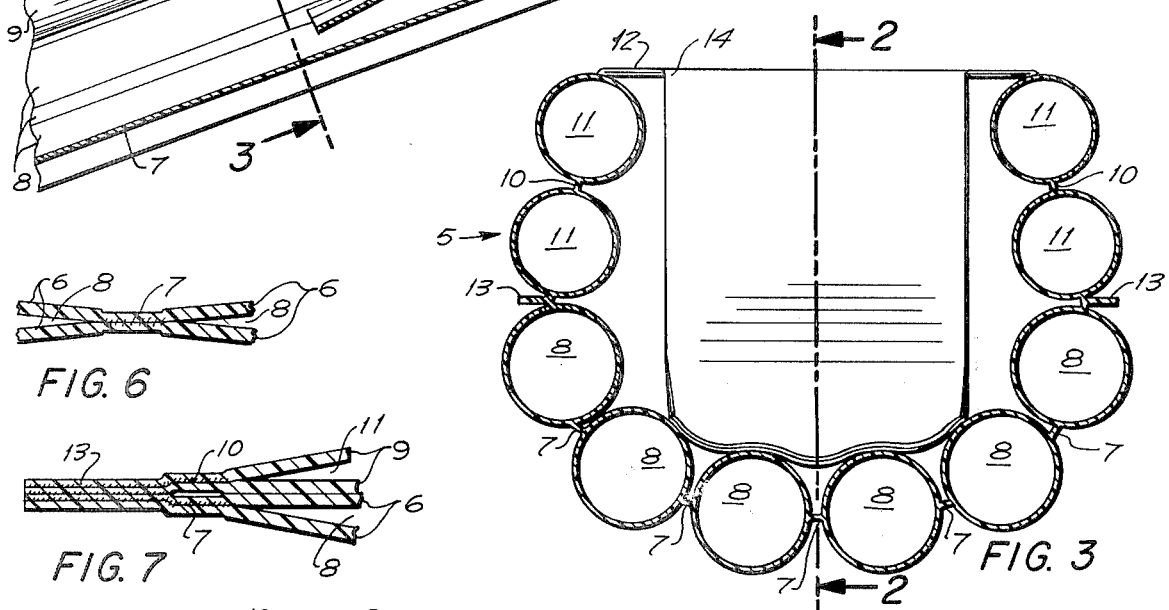
FIG. 3 is an enlarged transverse sectional view thereof taken through 3—3 of FIG. 2.
Figure 6:
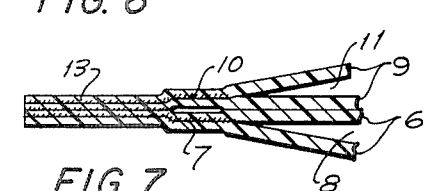
FIGS. 6 and 7 are further enlarged fragmentary sectional views, showing the bonded margins of the tubes forming the chute, taken within circle 6 and circle 7 of FIG. 4.
Figure 7:
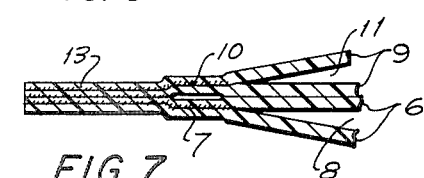
Figure 4:
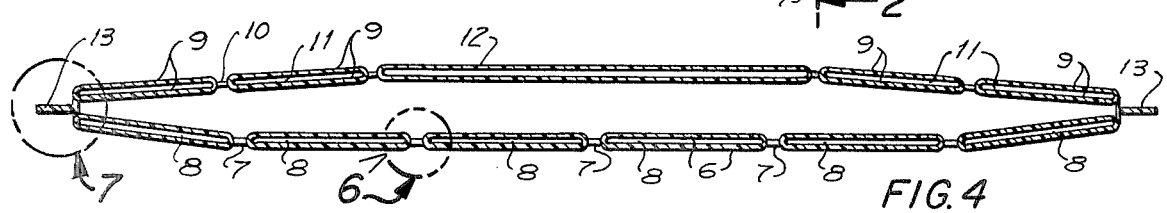
FIG. 4 is a transverse sectional view showing the fruit collector chute in a nearly collapsed condition.
Figure 5:
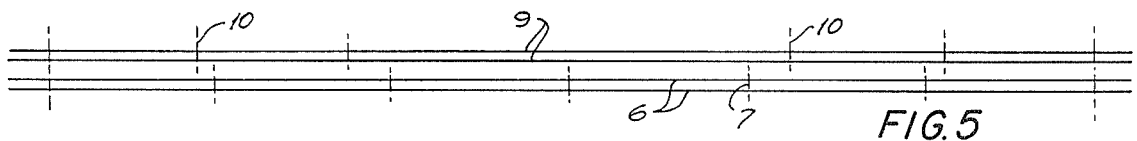
FIG. 5 is a diagrammatical view showing the strips of material comprising the fruit collector chute and indicating the planes along which the strips are joined together.

The strips 6 and 9 are preferably formed of transparent or translucent plastic material such as polyethylene, polybutylene, or polypropylene having an optimum thickness of approximately 0.006 inches (0.15 mm). Because of the necessarily small scale, the thickness of the materials shown in FIGS. 2, 3 and 4 is exaggerated. Also the widths of the webs 7 and 10 are exaggerated. Actually, the widths of the webs may be in the order of ⅛th of an inch (3.2 mm.) in which case the inward portions of the tubes may be in mutual contact when the tubes are inflated and form a chute.

The top panel 12 is provided with a series of access openings 14 which may be single slits extending longitudinally or preferably may be U-shaped; that is, formed by parallel slits joined at one end so as to form a series of rectangular flaps 15 of such length that their extended portions rest on the bottom of the chute 5 as shown in FIGS. 2 and 3. The flaps are particularly useful on steeper slopes as they serve to retard the movement of the fruit. For lower hillside slopes, the flaps may be wrapped about the remaining portions of the top panel 12 or the spacing between the openings may be such that the flaps may simply overlie the remaining portions of the top panel. While it is preferred to form the top panel of two strips as it simplifies manufacture and permits cutting the flaps to different lengths, the top panel 12 may be formed from a single strip.

For purposes of transportion, the chute may, when deflated, be readily wrapped upon a reel 16 as indicated in FIG. 1. The reel, of course, is mounted on an appropriate vehicle movable along the upper access road 3 so that the chute 5 may be extended downwardly therefrom. Referring to FIG. 8, the lower end of the chute 5 is attached to a manifold 17 which is channel shaped in cross-section, and includes parallel lateral sides 18 joined by angularly converging bottom sides 19. The bottom sides 19 converge dowardly and are joined to a depending inlet tube 20. The upper ends of the lateral sides 18 are joined by a connecting bar 21.

As shown in FIGS. 9 and 10, the inner or confronting sides of the manifold 17 are provided with outlet openings 22, one for each tube 8 and 11. Each tube is provided with an access opening 23 which overlies a corresponding outlet opening 22 and is secured in position by a clamp cup 24 having a clamp flange 25. The clamp cup 24 extends into the manifold as shown in FIG. 10 and its inner end is provided with a cross bar flanked by air outlets 27. The cross bar 26 receives a clamp screw 28 extending outwardly through the manifold and provided with a screw head 29.

Mounted on the manifold 17 is a clamp frame 30 which conforms to the manifold and extends along a margin of the manifold as shown in FIGS. 8, 9 and 10. The extremities of the clamp frame 30 are disposed at the extremities of the connecting bar 21 and are joined thereto by a pair of pivots 31. The bottom apex of the clamp frame is provided with a clamping screw 32. Cemented or otherwise secured to the manifold and underlying the clamp frame 30 is a padding strip 33. The extremities of the tubes 8 and 11 are extended between the clamp frame 30 and the padding strip 33 and they are sealed by the clamp frame. The end portions of the tubes 8 and 11 when inflated form a cushion protecting the fruit from contact with the manifold, as indicated in FIG. 10.

Figures 11, 12:
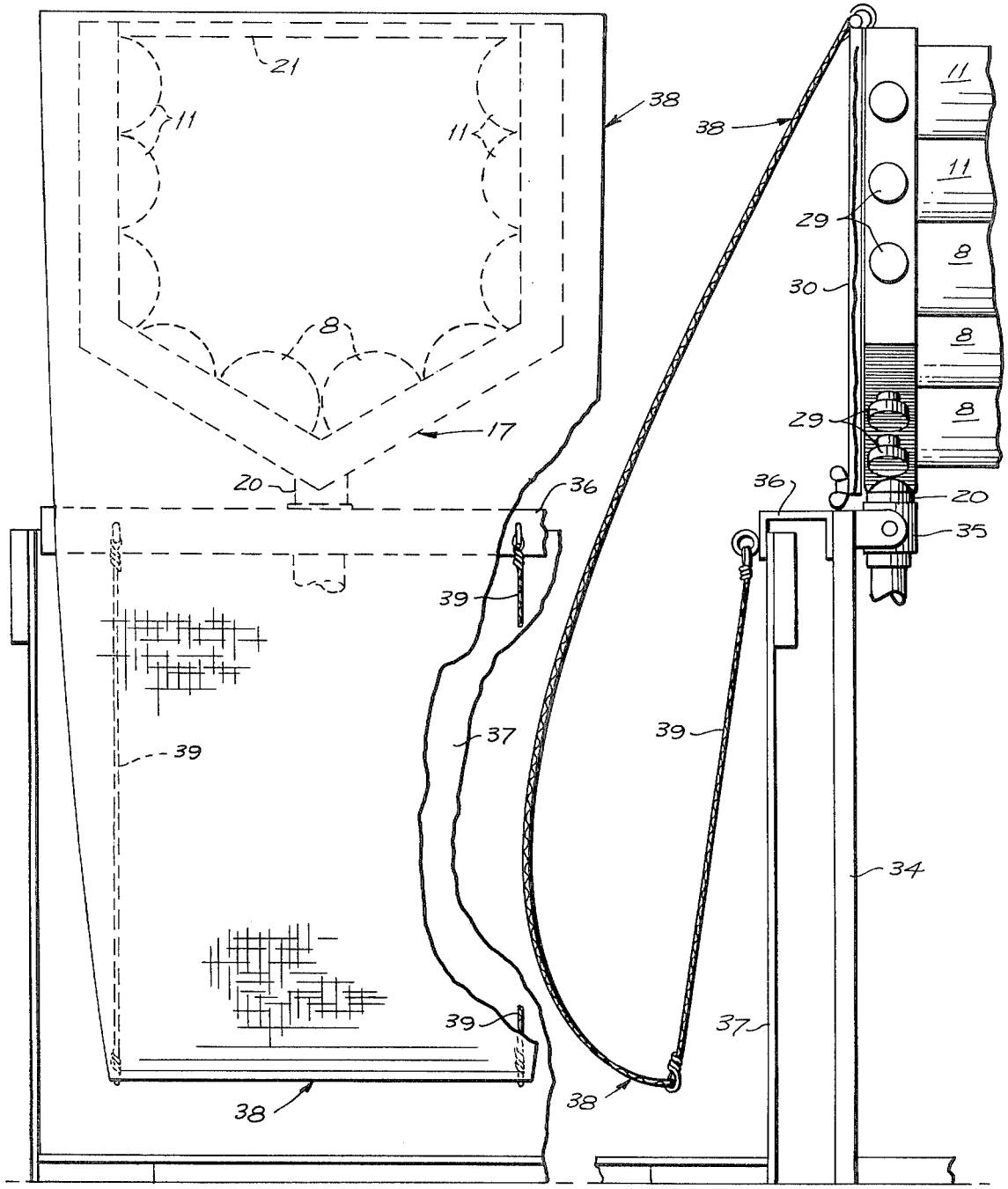
FIG. 11 is an end view of the fruit collector chute showing an apron positioned to deflect the fruit discharging from the collector chute.
FIG. 12 is a fragmentary side view of the discharge end of the fruit collector chute showing a deflector apron.
Figure 13:
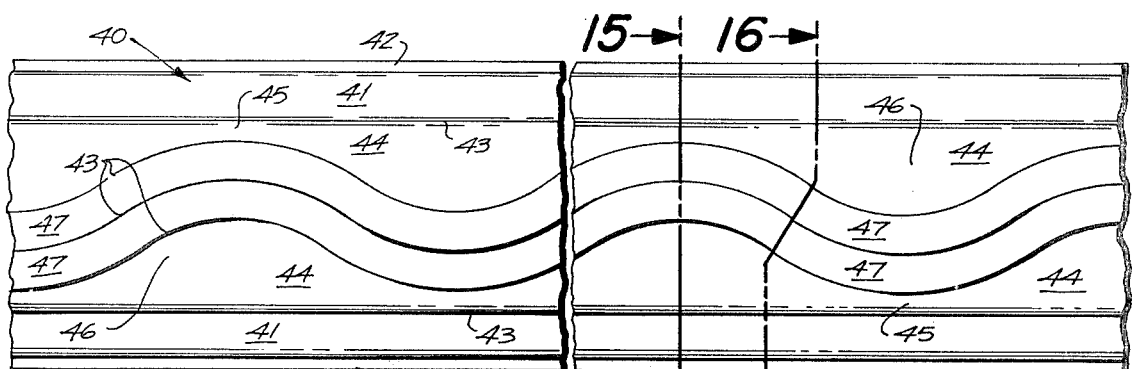
FIG. 13 is an essentially diagrammatical and fragmentary plan view of the web structure forming the bottom unit of the chute shown in its deflated flat condition.
Figure 14:
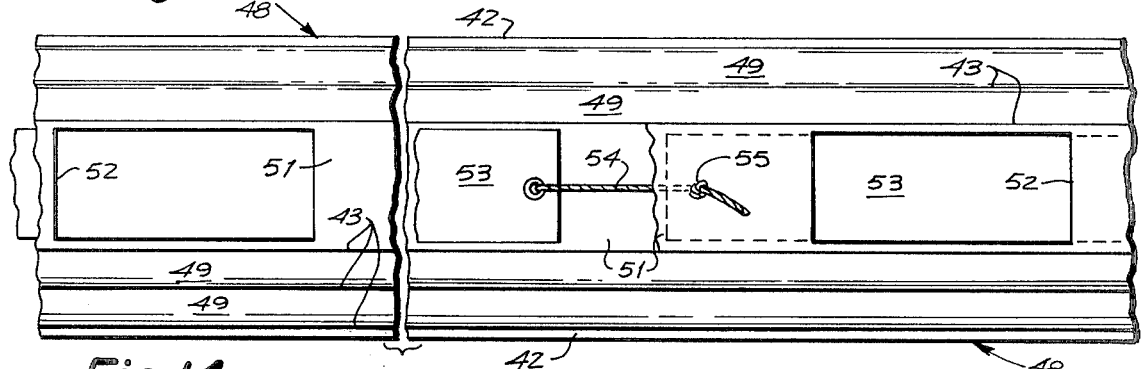
FIG. 14 is an essentially diagrammatical and fragmentary plan view of the web structure forming the top unit of the chute shown in its deflated flat condition.

Referring to FIGS. 11 and 12, the manifold 17 is secured in place by a mounting frame 34 having a sleeve 35 which receives the inlet tube 20. The mounting frame may also include an inverted channel member 36 adapted to overlie a margin of a field box 37. In order to cushion the impact on the fruit, an apron 38 formed of cloth or the like overlies the manifold 17. The upper end of the apron 38 is suitably fastened to the connecting bar 21 and its lower end extends into the field box 37. The lower end of the apron 38 is joined by cords 39 to the channel member 36.

Operation of the fruit collector shown in FIGS. 1–12 is as follows:

The reel 16 with the chute in its deflated condition rolled thereon is positioned between two downwardly extending rows of trees or other fruit bearing plants and the chute is unrolled therefrom until the manifold 17 is positioned at the lower access road 4. The manifold is then attached to the mountaing frame 34, a field box 37 is positioned, and the apron 38 is secured in place and extended into the field box. Previously the access openings 14 are formed in the top panel 12. The spacing may correspond to the spacing of the plants or trees. Fruit from the trees are transported manually to the chute, passed through the access openings 14, and placed on top of the flaps 15, if present. The fruit so placed immediately moves clear of the flap permitting fruit from above to pass under the flap. It is also possible to place the fruit on the remaining portions of the top panel 12 between the flaps, depressing the panel towards the bottom of the chute, thus minimizing impact on the fruit. Once inside the chute, the fruit rolls downward and discharges against the apron 38 which minimizes impact as the fruit is received in the field box.

Figure 15:
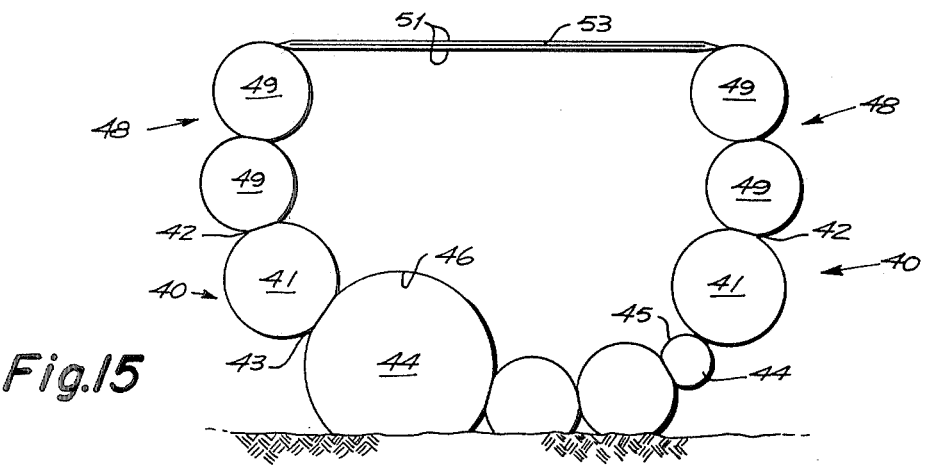
FIG. 15 is an enlarged transverse essentially diagrammatical sectional view of the chute, when inflated, taken through 15—15 of FIG. 13, because of the small scale, the section being represented by single lines.
Figure 16:
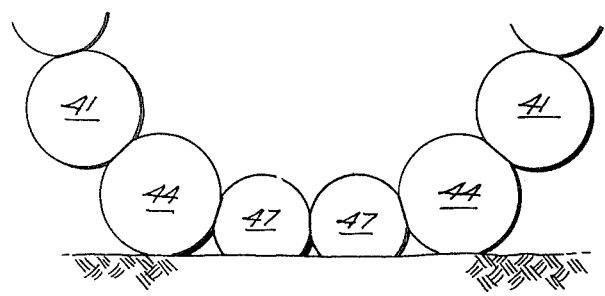
FIG. 16 is an enlarged essentially diagrammatical transverse sectional view of the chute, when inflated, taken through 16—16 of FIG. 13.

Referring to FIGS. 13 through 17, the embodiment here illustrated includes a bottom unit 40 formed of two laminations of sheet plastic material in which is formed of lateral side tubes 41 disposed between the lateral bonded margins of 42 of the bottom unit and narrow bonded webs 43. Inward from the pair of side tubes 41 there is formed a pair of undulated tubes 44 having portions 45 of minor diameter and portions 46 of major diameter when the bottom unit is inflated as shown in FIG. 15. Between the undulated tubes 44 is a pair of central tubes 47 of uniform width also joined by bonded webs 43.

A top unit 48 is provided also comprising a pair of strips of plastic sheet material. The top unit is provided at each side with a pair of lateral side tubes 49 joined by bonded webs 43 and by bonded margins 42 corresponding to the bonded margins of the bottom unit 40. The inner pair of the side tubes 49 are joined by bonded webs 43 to a connecting panel 51 having two laminations.

The panel 51 corresponds to the panel 12 and is provided with access openings or fruit receiving openings 52. As in the first described embodiment, the openings 52 are spaced approximately the distance between lateral rows of trees. Each portion of the connecting panel 51 between a pair of openings 52 receives a fruit movement retarding ribbon 53 corresponding to a flap 15. A cord 54 is attached to one end of each ribbon 53 and passes through a perforation for external access and knotted, as indicated by 55. Each fruit movement retarding ribbon 53 is approximately equal in length to the distance between panel openings 52. However, they may be longer or shorter depending upon the slope of the hillside. Operation of the embodiment shown in FIGS. 13 through 17 is as follows:

Before or after placement of the chute the flaps are extended or retracted in accordance with the hillside slope. That is, if the hillside is steep, the ribbons are extended. As the degre of slope decreases, the effective length of each ribbon may be shortened by pulling the ribbon into the panel 51 by means of the cord 54. This arrangekment also permits the ribbons to be adjusted if the slope increases or decreases. Furtheremore the ribbons may overlap as indicated in FIG. 17. Due to the weight of the fruit F, retardation of fruit movement is increased by reason of the weight of fruit on the uppermost ribbon.

By providing the undulated tubes 44, the fruit F is caused to move in an undulating manner which has the effect of retarding its movement to compensate for the slope of the chute.

As in the first described embodiment, the widths of the bottom unit 40 and the top unit 48, when deflated, are the same and their margins 42 are bonded together. Consequently, when the units are deflated, the complete chute may be rolled into a relatively compact bundle and thus is readily transported.

Referring to FIGS. 18 and 19, the chute designated generally by 56, may have a cross-section similar to that shown in FIG. 3; that is may comprise tubes 8 and 11 joined by a top web 12. The chute is made in sections 57 and 58 joined together in zig-zag relation. The sections are joined in a conventional manner by sewing the sections together or heat sealing or by use of adhesive binding strips or combinations thereof. The top web may be formed as shown in FIGS. 2 and 3 and provided with flaps 15, or flaps 53 or mere access openings 59 may be provided.

By reason of the zig-zag pattern the fruit is rolled from side-to-side materially reducing the rate of movement.

The zig-zag chute may be rolled on or unrolled from a drum of appropriate width.

The zig-zag pattern may be used in connection with embodiment shown in FIGS. 13 through 17 to further reduce the rate of movement.

Having fully described my invention, it is to be understood that I am not to be limited to the details herein set forth, but that my invention is of the full scope of the appended claims.

I claim:

1. A fruit collector for hillside orchards wherein the trees are arranged in sloping rows essentially parallel to the slope of the hillside and transverse essentially level rows, the collector comprising:
   a. a tubular chute adapted to be positioned directly upon the hillside between sloping rows of trees whereby fruit from the transverse rows may be brought to opposite sides of the chute;
   b. the chute having bottom and side walls formed of inflated tubes, and an essentially flat panel including opposed panel elements joined at their side margins to form a flat tube joining the upper extremities of the side walls and held in spaced relation to the bottom wall by the inflated side walls to complete figuration of the chute thereby to retain the fruit enclosed therein;
   c. the panel having a series of access openings spaced essentially the distance between the transverse rows of trees to receive fruit picked therefrom, for gravitational movement to the lower end of the chute;
   d. and a fruit retarding ribbon slidably received in the panel for adjustable extension and retraction to vary the length of ribbon received in the chute, thereby to vary the fruit retarding effect of the ribbon.

2. A fruit collector, as defined in claim 1, wherein:
   a. the lengths of the fruit retarding ribbons are such as to be capable of overlapping longitudinally, thereby increasing the fruit retarding effect.

3. A fruit collector for hillside orchards, comprising:
   a. an enclosed chute structure formed of inflated tubes defining the bottom and opposite sides of the chute structure, and an uninflated essentially flat tubular panel forming the top thereof, the panel having a series of fruit receiving openings therein;
   b. and a fruit movement retarding ribbon received in each panel and extending therefrom into the corresponding fruit receiving opening for engagement by the fruit received therein;
   c. the ribbons being extensible past openings into the chute structure to increase retardation of the fruit and retractable to reduce retardation of the fruit.

4. A fruit collector, as defined in claim 3, wherein:
   a. selected tubes are longitudinally undulated to effect increased movement retardation of the fruit.

5. A fruit collector, as defined in claim 3, wherein:
   a. the chute structure defines a pair of web structures of equal width capable of being rolled about a common axis for transportation.

6. A fruit collector, as defined in claim 3, which further includes:
   a. a U-shaped tubular manifold having radially inwardly directed outlet openings and clamp means for connecting each tube to a corresponding opening to receive fluid therefrom.

7. A fruit collector, as defined in claim 3, wherein:
   a. the chute comprises a series of sections joined end-to-end in zig-zag pattern.

8. A fruit collector for hillside orchards wherein the trees are arranged in sloping rows essentially parallel to the slope of the hillside and transverse essentially level rows, the collector comprising:
   a. a tubular chute adapted to be positioned directly upon the hillside between sloping rows of trees whereby fruit from the transverse row may be brought to opposite sides of the chute;
   b. the chute having bottom and side walls formed of inflatable tubes, and an essentially flat panel joining the upper extremities of the side walls and held in spaced relation to the bottom wall by the inflated side walls to complete figuration of the chute thereby to retain the fruit enclosed therein;
   c. the panel having a series of access openings spaced essentially the distance between the transverse rows of trees to receive fruit picked therefrom, for gravitational movement to the lower end of the chute;
   d. and a U-shaped air supplying manifold having clamp means for sealing the extremities of the tubes, adjacent portions of the tubes being perforated and sealingly joined to the manifold to receive air therefrom.

9. A fruit collector for hillside orchards wherein the trees are arranged in sloping rows essentially parallel to the slope of the hillside and transverse essentially level rows, the collector comprising:
   a. a tubular chute adapted to be positioned directly upon the hillside between sloping rows of trees whereby fruit from the transverse row may be brought to opposite sides of the chute;
   b. the chute having bottom and side walls formed of inflatable tubes, and an essentially flat panel joining the upper extremities of the side walls and held in spaced relation to the bottom wall by the inflated side walls to complete figuration of the chute thereby to retain the fruit enclosed therein;
   c. the panel having a series of access openings spaced essentially the distance between the transverse rows of trees to receive fruit picked therefrom, for gravitational movement to the lower end of the chute;
   d. selected tubes, when inflated, varying in area longitudinally to provide an undulating path thereby increasing retardation of the fruit moving down the chute.

* * * * *